United States Patent [19]

Kamimura et al.

[11] Patent Number: 5,321,224
[45] Date of Patent: Jun. 14, 1994

[54] METHODS OF MODIFYING SURFACE QUALITIES OF METALLIC ARTICLES AND APPARATUSES THEREFOR

[75] Inventors: Tadashi Kamimura, Yokohama; Akira Tsujimura, Chigasaki, both of Japan

[73] Assignee: Isuzu Motors Limited, Tokyo, Japan

[21] Appl. No.: 666,169

[22] Filed: Mar. 7, 1991

[30] Foreign Application Priority Data

Mar. 7, 1990 [JP] Japan .................................. 2-53740
Apr. 20, 1990 [JP] Japan ................................ 2-102984
May 31, 1990 [JP] Japan ................................ 2-139677

[51] Int. Cl.$^5$ ............................................. B23K 9/04
[52] U.S. Cl. ............................. 219/76.15; 219/76.14; 219/137 R
[58] Field of Search ............... 219/76.12, 76.14, 76.15, 219/76.16, 75, 137 R, 137.2, 146.31

[56] References Cited

U.S. PATENT DOCUMENTS

| | | | |
|---|---|---|---|
| 2,003,020 | 5/1935 | Strobel | 219/146.31 |
| 2,756,311 | 7/1956 | Persson et al. | 219/75 |
| 2,868,954 | 1/1959 | Skinner et al. | 219/137 R |
| 2,868,956 | 1/1959 | Lobosco | 219/137 R |
| 3,278,720 | 10/1966 | Dixon | 219/137.2 |
| 3,549,857 | 12/1970 | Needham et al. | 219/137 R |
| 4,291,220 | 9/1981 | Lessmann et al. | 219/137 R |

*Primary Examiner*—Clifford C. Shaw
*Attorney, Agent, or Firm*—Dykema Gossett

[57] ABSTRACT

A method of modifying qualities of a metallic article at a particular surface of the article comprises the step of melting the surface by imparting a flux of high density energy to the surface to form a molten metal layer and the step of adding heat resisting element to the molten metal layer by performing overlay welding to the molten metal layer.

20 Claims, 4 Drawing Sheets

METHODS OF MODIFYING SURFACE QUALITIES OF METALLIC ARTICLES AND APPARATUSES THEREFOR

BACKGROUND OF THE INVENTION

1. Technical Field

The present invention relates to a method of modifying qualities of a metallic article at its surface utilizing high density energy, and an apparatus therefor.

2. Background Art

Figure 12:
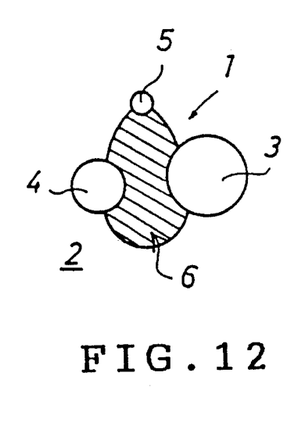
FIG. 12 illustrates the bottom of a cylinder head useful to explain problems existing in a prior art techinque.
Figure 13:
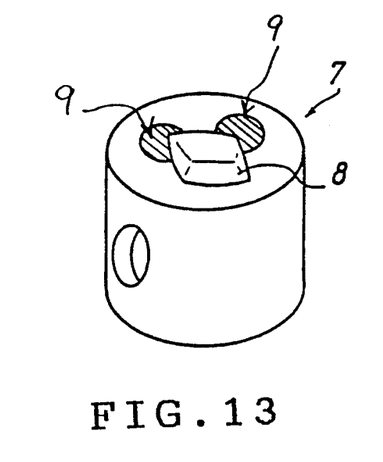
FIG. 13 schematically illustrates a piston useful to explain problems existing in the prior art technique.

There is an increasing need for strengthening metallic parts, such as aluminum castings, at their local parts, particularly at specified locations on their surfaces In the automotive parts industry, for example, a cylinder head made of aluminum or cast iron casting should bear greater thermal load as well as mechanical load as engine output increases, because its operating temperature reaches a considerably high temperature. Such an increase in load on the engine parts results in unexpected thermal cracking, as shown in FIG. 12, between an intake port 3 and an exhaust port 4 (referred herein as "intervalve part 6", which is thinner than other portions), and between the intervalve part 6 and a fuel injection nozzle port 5 (or the preheater chamber port). In addition, as shown in FIG. 13, a hatched portion 9 of a cylinder 7, which surrounds a combustion chamber 8 is also an object part since the hatched portions 9 bear a consideraly high load.

As for the methods of modifying qualities of the object parts, there is known a method called the "remelting method". This method is reported to attain a certain degree of satisfaction in improving the resistance to thermal cracking [See Kanazawa, Miyake and two others; "Development of aluminum alloy cylinder head for improving strength of its intervalve part by TTG remelting method", Toyota Gijutsu, Vol. 37, No. 2 (1987), pp. 112–119].

Many attempts have been made to supersede this method. The resultant techniques, which may be referred to categorically as the "remelting alloying method", are reviewed below in terms of their technical contexts and deficiencies:

1. The TIG welding method: While performing the remelting with a TIG welder, suitable heat resisting metal or alloy is supplied as the alloying additive in powdery form to the TIG arc through a powder feeder. Since the amount of the alloying additive that can be added to is 10% at the most by the volumetric ratio, however, not much improvement can be achieved. If the addition is increased forcibly, moreover, the gas that the matrix (Al casting) liberates on alloying gets entrapped in the weld molten pool, forming and leaving there the gas defects, typically porosity due to formation of blowholes.

2. The electron beam remelting method: The alloying elements are either placed on the object part beforehand or fed thereto in the form of filler wire, and are remelted with an electron beam. The operation must be conducted in vacuo, meaning that the supply of the additive elements is both difficult and costly not only in operational practice but also mechanically; if powdery, moreover, they must be prevented somehow from scattering on the one hand, and on the other hand, the surfaces of the work piece other than the object parts must be protected from getting contaminated with the scattered powder.

3. The laser method: Although lasers can be used in the ambient air, both the object part and the additive elements must either be sufficiently dark in color or be coated over with a black paint, lest the absorption of the laser ray should be insufficient. Besides, laser-based apparatuses are still too expensive today.

4. The plasma welding method: This method operates in much the same way as the TIG method, except that the depth of penetration is some 20-30% less here. The TIG's fault of overzealous addition resulting in formation of the gas defects is left unresolved.

As reviewed above, the currently available methods cannot are not practical because of their characteristic faults.

SUMMARY OF THE INVENTION

The primary purpose of this invention resides in markedly increasing the amount of the heat resisting element or elements to be added (the "additive") to modify the quality of the specified surface part (the "object" part) of metallic articles so as to improve their properties, for example, the resistance to thermal cracking, a great deal.

Another purpose of this invention resides in providing an inexpensive method of and apparatus for modifying surface qualities of a metallic article.

The third purpose of this invention resides in making the alloy layer that has been formed on adding the additive free of gas defects such as blowholes, or other welding defects.

The fourth purpose of this invention resides in making the structure of that alloy layer homogeneous.

The fifth purpose of this invention resides in eliminating the need of pre-treating such as machining of the object part prior to the surface modification operation.

The sixth purpose of this invention resides in improving productivity by increasing the welding speed pertaining to the quality modification operation.

The seventh purpose of this invention resides in increasing the depth of the penetration in forming the alloy layer overlay.

This invention relates also to a quality of the object part utilizing high density energy, which comprises the steps of melting the object part by imparting a flux of high density energy thereto and adding to the object part thus melted a heat resisting element or elements (the "additive") by the overlay welding method.

Second, this invention relates to a method that comprises, in addition to the steps mentioned above, the step of remelting the object part once again with the high density energy.

Third, this invention relates to a method that comprises the step of melting the object part with the high density energy and the step of adding the additive at least twice over to the object part now molten by the overlay welding method.

Fourth, this invention relates to a method that comprises, in addition to the steps mentioned above, the step of remelting the object part once again with the high density energy.

Here, the overlay welding may be conducted using the powder additive, which may either be the powder of such a heat resisting metal as Ni, Co, Mo and Cr, or better still, be that of capsule particles, each capsule particle being made from a heat resisting metal particle as its core and metallic particles as its covering envelope. The overlay welding may also be conducted with a welding wire that contains the additive.

Thus, fifth, this invention relates, in the method of modifying the quality of the object part with the high density energy, that comprises the step of melting the object part such as a part of the surface of an aluminum casting with the high density energy, and the step of conducting the overlay welding by the MIG welding method on the object part now molten, using an additive-containing wire as an electrode. Here, the welding wire may be one which is made of a heat resisting steel, but better still, it may be a composite wire formed from a sheath filled with the capsule particles. The capsule particle has a heat resisting metal particle as the core and metallic particles as the envelope.

Sixth, this invention relates, in the method of modifying the quality of the object part with the high density energy, to a method that comprises the step of manufacturing the composite wire by filling a sheath with the capsule particles described above, the step of performing the overlay welding on the object part using the composite wire manufactured in the preceding step as the filler and the step of performing the overlay welding on the object part now overlaid once using a welding wire made of a heat resisting steel (the "heat resisting steel wire").

Seventh, this invention relates to a method of modifying the quality of the object part with the high density energy, that comprises a first step of manufacturing the composite wire described above, a second step of melting the object part with the high density energy, a third step of performing the overlay welding on the part now molten in the second step by a MIG welder using the composite wire manufactured in the first step, and a fourth step of performing the overlay welding on the object part overlaid in the third step by a MIG welder using a heat resisting steel wire. Here, the core particles of the capsule particle may be a heat resisting metal such as Ni, Co, Mo and Cr, or a ceramic such as $Al_2O_3$, SiC, $Si_3N_4$ and CuO; the metallic particles that constitute the envelope may preferably be of a metal that is miscible with the metal of the object part; and the sheath of the composite wire may preferably be of a metal that is miscible with the metal of the object part.

The high density energy source to conduct the melting or remelting with may be any of the TIC welder, the plasma welder, the electron beam welder or the laser beam welder; the overlay welding using a fine powder may preferably be performed by either the TIG or plasma welder; whereas the overlay welding using the wire may preferably be conducted by any of the TIC, plasma or MIG welder. Finally, at least one of those repetitious overlay weldings may preferably be performed by the MIG welder.

As for the apparatus, the present invention provides an apparatus for modifying the object surface part of metallic articles, which comprises a first welding device to impart the high density energy to the object part while translating itself in a given direction and a second welding device disposed behind the first welding device in respect to the direction of translation (namely, the direction of operation) keeping a given distance ("disposed in tandem") to perform the overlay welding using the additive.

According to another aspect of the present invention, there is provided an apparatus that comprises, in addition to the two welding devices mentioned above, a third welding device, provided in tandem with the second welding device, for imparting the high density energy to the object part.

Third, the present invention provides an apparatus comprising a first welding device for imparting the high density energy, while translating itself in a given direction, to the object part, and second welding device disposed in a tandem relation with the first device for performing the overlay welding using the additive. The second device may include at least two welders arranged in series.

Fourth, the present invention provides an apparatus which comprises, in addition to the first and second welding devices described above, a third welding device disposed tandem with the second welding device for imparting the high density energy to the object part. Here, the first welding device may be any of a TIG torch, plasma, electro beam or laser welder. Preferably, the second welding device may any of a TIG torch, plasma or MIG welder. The third welding device may preferably be any of a TIG torch, plasma, electron beam or laser welder.

Finally, the present invention provides an apparatus which comprises a MIG welder to perform the overlay welding on the object part using a composite wire having a sheath filled with capsule particles, each particle having a core of heat resisting metal and an envelope of metallic particles, and a second MIG welder disposed in tandem with the first MIG welder to perform the overlay welding using a heat resisting steel welding wire.

As for the advantages of the present invention, a marked increase in the amount of additive addition can readily be attained without giving rise to welding defects such as gas defects, typically the porosity due to formation of blowholes. Also, the alloy layer overlay formed is deeper in penetration, higher in the heat resistance such as the resistance to thermal crackings, more free of weld defects and more uniform in the structure than ever. Moreover, the present invention needs no pretreatment of the object such as machining and permits fast welding to improve productivity.

Therefore, the present invention provides an inexpensive method and apparatus to improve the qualities of a specified surface part of the metallic article.

DESCRIPTION OF THE PREFERRED EMBODIMENTS

Now, preferred embodiments of the present invention will be described with the accompanying drawings.

Figure 1:
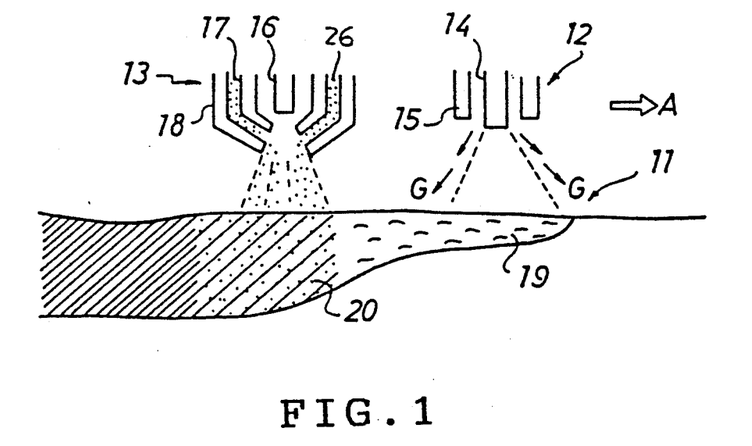
FIG. 1 is a schematic section of a first embodiment of the present invention, pertaining to the method of modifying a specified part of the surfaces of metallic articles (object part) and the apparatus therefor.

Referring to FIG. 1 first, illustrated is a first embodiment of a method of modifying a specified surface part of a metallic article (object part) and an apparatus therefor.

In this embodiment, the object part 11 of a cylinder head of an aluminum casting is first melted with high density energy, then it is added with heat resisting element(s) (additive) by overlay welding. Here, an apparatus for this method includes a first welding device and a second welding device. The first welding device may be a TIG torch 12 to impart the high density energy to the object part 11. The second welding device may be a plasma welder 13 disposed in tandem with the first welding device 12. The second welding device 13 is used to perform the overlay welding using a powdery additive. The powdery additve may be Ni powder 26. In the TIG torch 12, an electrode 14 forms welding arc and a nozzle 15 jets out inert gas G to shield off the arc and molten metal 19. In the plasma welder 13, the electrode 16 made of tungsten creates the welding arc. An inner nozzle 17 jets out working gas to increase the energy density by confining the welding arc within itself. An outer nozzle 18 feeds the Ni powder 26 in performing the overlay welding. As the pair of the welding devices, i. e., the TIG torch 12 and the plasma welder 13, are kept moving, with a preassigned distance being maintained between them, along the object part surface 11 in the welding direction A, a molten metal layer 19 is first formed by the TIG torch 12, then immediately following it, an overlaid layer 20, now added with Ni to predetermined content (alloy layer) is formed as the Ni powder is dissolved into the molten metal layer 19 by the plasma welder 13. Here, the benefit of providing the TIG torch 12 is two-fold: under the intensive heating of the TIG, the gas which will become the cause of the gas defects (typically the porosity) is readily exorcised out of the matirix metal, thereby preventing occurrence of gas defects in an alloy layer 20 even when the content of the additive is markedly increased, for example to as much as 15% or ever more in the case of Ni. The TIG torch 12 works as a preheater for the plasma welder 13 so that not only the occurrence of weld cracking is effectively prevented but an ample penetration is ensured.

As for the first welding device of this embodiment, any device that can produce adequately high density energy such as electron beam, laser and plasma may be used instead of the TIG torch 12, as long as the energy density meets requirements set forth above. As for the additive 26, a heat resisting metal such as Cr, Mo and Co or even the capsule particles made by compositing dissimilar substances (will be described below) may be used as long as its nature as the additive meets the requirements set forth above.

Figure 2:
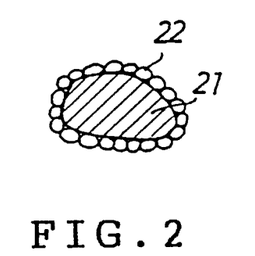
FIG. 2 is a schematic section showing a process of manufacturing a capsule particle to be used as a component of a welding powder in the process of FIG. 1.
Figure 3:
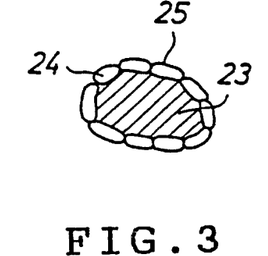
FIG. 3 is a sectional view of the capsule particle.
Figure 4:
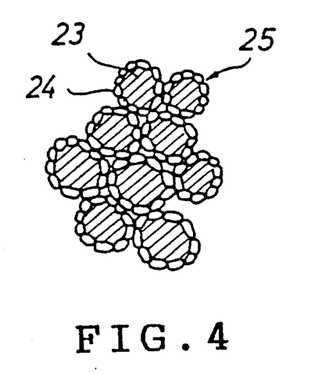
FIG. 4 shows a schematic view of the welding powder which is an agglomerate of the capsule particles of FIG. 3.

The capsule particles mentioned above may be manufactured as shown in FIG. 2. That is to say, first Ni particles 21 are prepared and Al particles 22 of a size about one tenth of that of the Ni particle 21 are allowed to adhere electrostatically onto the individual Ni particle. Then as intermediately formed (preforms), they are charged into a vessel equipped with a bladed screw that rotates at a high speed of 8,000 to 16,000 rpm (a machine which is known as centrifugal roll forming machine or a hybridizer) so that the preforms are subjected for 1 to 10 minutes to the impact force which the gas stream imparts to them. Through this process, not only individual capsule paticles 25 are formed with a Ni particle 21 as its core 23 and the smaller Al particles 22 completely enveloping the Ni particle 21 as a cover, but agglomerates of capsule particles 25 are formed as illustrated in FIG. 4 to serve conveniently for the welding additive powder 26.

Here, the core 23 of the capsule particle 25 may be any heat resisting metal such as Cr, Co and Mo, instead of Ni, or even be a ceramic such as $Al_2O_3$, $SiC$, $Si_3O_4$ and $CuO$. The enveloping particles 24 may be any metal such as Cu and its alloys that has a good miscibility with the matrix of the object part (Al).

In the foregoing, it will be understood that the use of the capsule 25 promises an expected sufficient miscibility to the matrix Al of the object part, thereby ensuring perfect admixing of Ni with Al, hence excellent quality for the alloy layer 20.

Figure 5:
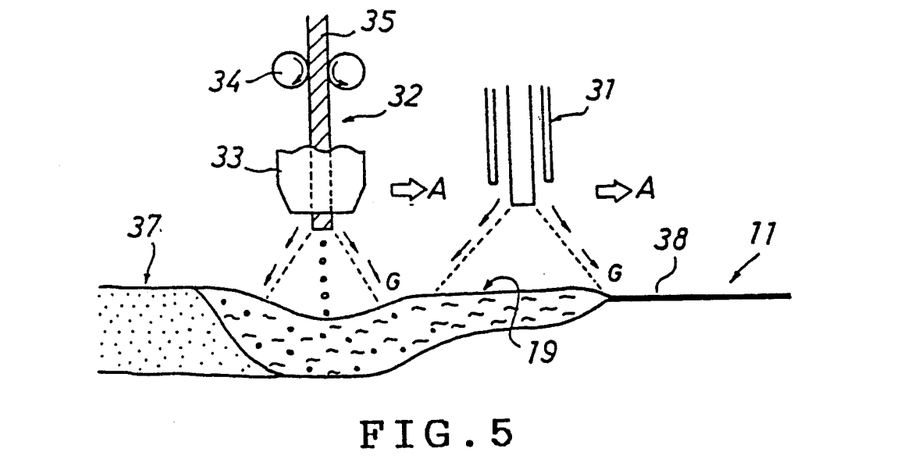
FIG. 5 schematically shows a lateral section of a second embodiment of the present invention.
Figure 6:
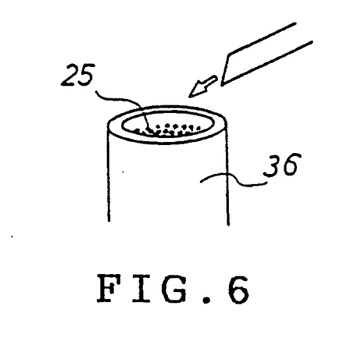
FIG. 6 illustrates a persepctive view of a process of manufacturing a composite wire to be used for the welding wire in the process of FIG. 5.
Figure 7:
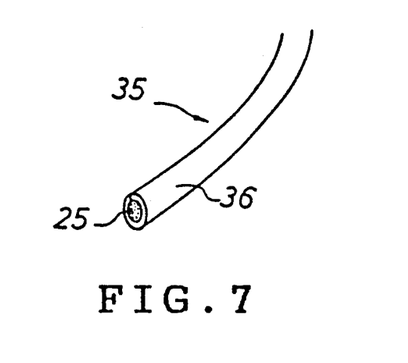
FIG. 7 is a perspective view of the composite wire.

In the second embodiment of the present invention, which is similar to the first embodiment, as depicted in FIGS. 5 to 7, to an extent that the object part is likewise subjected first to the melting by a first welding device then to the alloying by are second overaly welding device. These two welding devices are arranged in a tandem relation to each other. The first welding device may be a TIG torch 31. The second welding device may be a TIG welder 32. In the MIG welder 32, a nozzle 33 Jets out shield gas G. A wire feeder 34 feeds a welding wire which serves as a consumable electrode so as to carry out the overlay welding for the object part 11. In this embodiment also, a composite wire 35 that contains the capsule particles 25 introduced in the foregoing embodiment may be used.

The composite wire 35 may be manufactured as shown in FIG. 6; a sheath (tubing) 36 made of Al is filled with the capsule particles 25, then it is drawn into a composite wire 35 of diameter of 0.8 to 1.6 mm or thereabout. The composite wire 35 thus formed may be treated just like a known flux cored welding wire.

By allowing the TIG torch 31 to advance so as to create a molten pool of Al (molten layer metal layer 19) and then letting the MIG welder 32 perform the overlay welding with the composite wire 35 as the consumable electrode, an alloy 37 is progressively formed as the Ni additive 27 is added to the molten metal layer 19 in the form of drippings from the composite wire 35.

Now, it will be further noted that even though the object part 19 is ordinarily covered with an oxide ($Al_2O_3$) film 38 to stanc obstacle to MIG welding, the film 38 has been fractured by the action of the TIG torch 31 to expose the underlying Al matrix afresh, thereby making the MIG welding readily possible. This means that no pretreatment such as machining of the object part 11 is necessary in taking the full advantage of MIG's fast welding speed. In addition, the occurrence of gas defects such as formation of blowholes is effectively prevented so that the alloy layer 37 will be finished free of weld defects. Furthermore, owing to the preheating by the TIG ar 31, the weld crackings are prevented and admirably deep penetration is ensured. Moreover, owing to the use of the composite capsule 25, Ni as an additve is introduced into the molten metal layer 19 homogeneously as described in conjunction with the previous embodiment, so that not only the occurrence of weld crackings is effectively prevented, but uniformity in both structure and composition is ensured for the alloy layer 37.

Other benefits are that by selecting the size of the core particle 21 in respect to that of the enveloping particle 22, the concentration of the addtive can be controlled in the formed alloy layer as desired, and that since the concentration of the heat resisting element with respect to Al, namely the state of admixing of the additive and Al, is uniform all along the length of the composite wire 35, the welding operation is very well stabilized on using the composite wire 35.

The sheath 36, moreover, may be any metal other than Al as long as it has a resonably good miscibility with Al. Namely, Cu and its alloys may be used. In addition, its cross section can have any configuration as long as it is suited for filling with and holding in itself the capsule particles 25; for example, a cross section out of those that are currently popular with the commercial flux-cored welding wires may be selected as desired.

Figure 8:
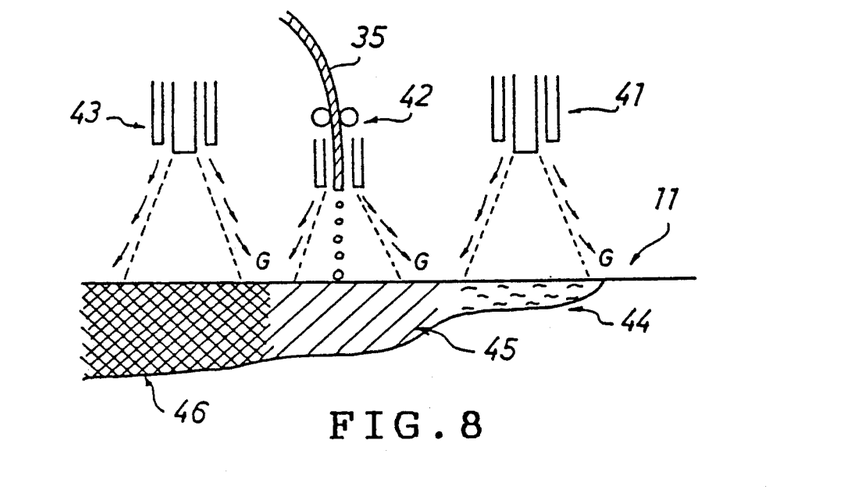
FIG. 8 shows a sectional view of a third embodiment of the present invention.

In the third embodiment, which is shown in FIG. 8, a third welding device (TIG torch 43) is employed and arranged in tandem with a first welding device (TIG torch 41) and a second welding device (MIG welder 42). The latter two are deployed as in the preceding embodiment. Here, the process comprises three serially continuous steps: the step of making a molten metal layer 44 by the leading TIG torch 41; the second step of forming the alloy layer 45 by the follow-up MIG welder using a composite wire 35; and the third step of remelting the alloy layer 45 by the trailing TIG torch 43 obtaining a remelt-treated alloy layer 46. The benefit of this embodiment method is that the additive content (for example, Ni) can be raised further and that the remelt-treated alloy layer 46 is further improved over the alloy layer 45 in that it is structurally more uniform in addition to being free of weld defects which is the main feature of the latter.

Figure 9:
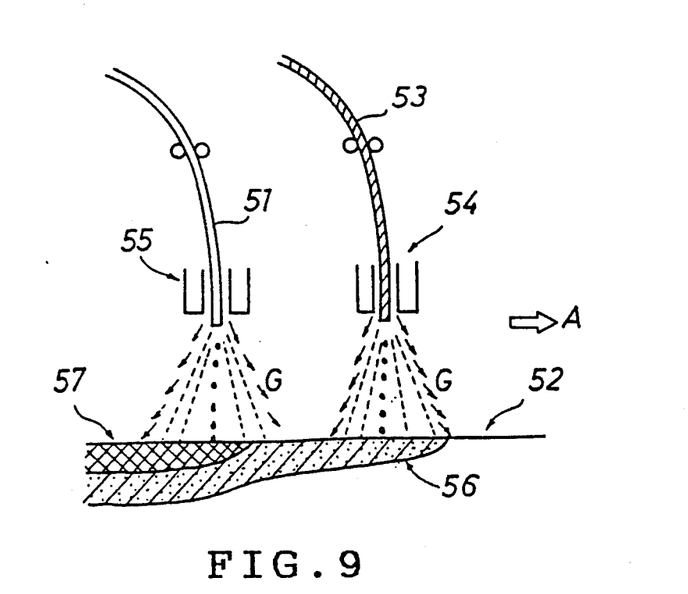
FIG. 9 shows a sectional view of a fourth embodiment of the present invention.

In the fourth embodiment of the present invention, which is shown in FIG. 9, an overlay welding step using a heat resisting steel wire 51 is added to the step of overlay welding using the composite wire 53 performed as in the foregoing second and third embodiments.

One typical example of the object part for applying this embodiment method to is the intervalve part 52 of a cast iron cylinder head (shown in FIG. 12 as the extended intervalve part 6). Here, two MIG welders 54 and 55 are deployed in tandem, of which the leading MIG 54 makes use of a composite wire 53, now having Cu tubing for its sheath and filled with capsule particles made up of Co particle as the core and Cu particles as the envelop, while the trailing MIG takes a heat resisting metal wire 51 for the electrode. That is to say, a first heat resisting alloy layer 56 containing an appropriate content of Co is overlaid on the intervalve object part 52 by the leading MIG welder 52, on top of which a second heat resisting alloy layer 57 is overlaid by the trailing MIG welder 55.

Besides those benefits of the present invention that have been cited in conjuction with the preceding embodiments, namely the well controlled large amount of additive addtion, improved weldability owing to the use of the composite wire 53 as well as to the preheating effect the leading welding device gives rise to, one benefit particular to this embodiment is that precipitation of cementite and occurrence of crackings are well prevented. Specifically, since Co has been added to the first alloy layer 56 as enveploped by Cu, a metal that has a high miscibility to Fe, alloy formation is done at with high precision. This means that not only uniform distribution of Co is ensured, but also embrittlement and occurrence of weld cracking due to cementite is effectively prevented, because cementite precipitation hardly occurs in such an alloy. Further, the first alloy layer 56 works as a buffer standing between the cast iron matrix and the second alloy layer 57. One conspicuous feature of this embodiment is therefore that the use of the high speed MIG welders have become practicable, thereby attaining a higher degree of productivitity.

As for the capsule particles 25 to be used here, moreover, many combinations other than the cited Co-Cu are possible: for example, Cr, Mo and the like for the heat resisting element or a ceramic paticle such as SiC, CuO, $Al_2O_3$ and $Si_3N_4$ for the core are possible. In addition, for the enveloping particle and for the sheath, metals other than Cu can be used as well, as long as they have sufficiently good miscibility with cast iron.

Figure 10:
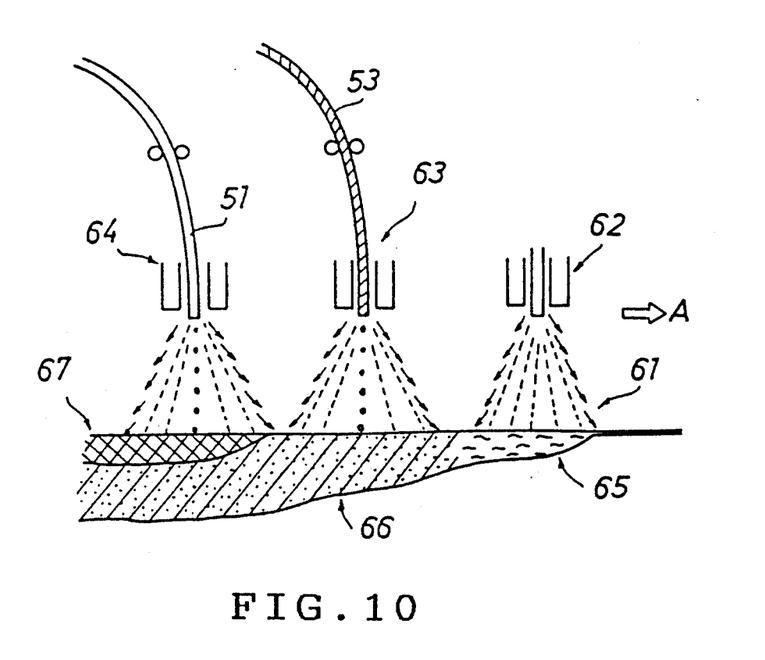
FIG. 10 shows a sectional view of a fifth embodiment of the present invention.

In the fifth embodiment, which is illustrated in FIG. 10, the object part 61 is first remelted by a first welding device (TIG torch 62), then overlaid with a heat resisting alloy layer at least twice over by a second welding device. The second welding device includes a pair of MIG welders 63 and 64 disposed in tandem with each other. In this case, the overlay welding is performed using the composite wire 53 introduced in the preceding fourth embodiment in the first round and using a heat resisting steel wire 51 in the second round. The overall result is the formation of a triple-layer overlay; first, a molten layer 65 by the TIG torch 62 which is overlaid with a Co-containing first heat resisting alloy layer 66 by the first MIG welder, which is in turn overlaid with second heat resisting alloy layer 67 made by the second MIG welder using a heat resisting steel wire 51. This ensures a marked improvement in the heat resistivity and effective prevention of thermal crackings.

Another feature of this embodiment is that, like in the case of aluminum casting of the first three embodiments, the pretreatment such as machining of the object is unnecessary. Yet another feature is that owing to the use of the TIG torch 62 and the preheating effect arising therefrom, marked improvement is gained in penetration and weldability.

Here, the ordering of the welding wires in the second welding device is not to be considered as limited to the particular combination cited above, which is a composite wire 53 then a heat resisting steel welding wire 51: other ordering or combination such as first a heat resisting steel wire then a composite wire, or first a heat resisting steel wire and then a heat resisting steel wire, or first a composite wire and then another composite wire are all permissible.

In addtion, for the heat resisting steel welding wire 51 mentioned in the fourth and fifth embodiments, the following are the examples:
  SUS 304 type: JIS Z 3321 Y308 and Y308L;
  SUS 309 type: JIS Z 3321 Y309 and Y309L;
  SUS 316 type: JIS Z 3321 Y310 and Y316L;
  Ni-base alloy: AWS A 5.14 ER Ni-1; and
  Inconel type: AWS A 5.14 ER NiCr-3

Figure 11:
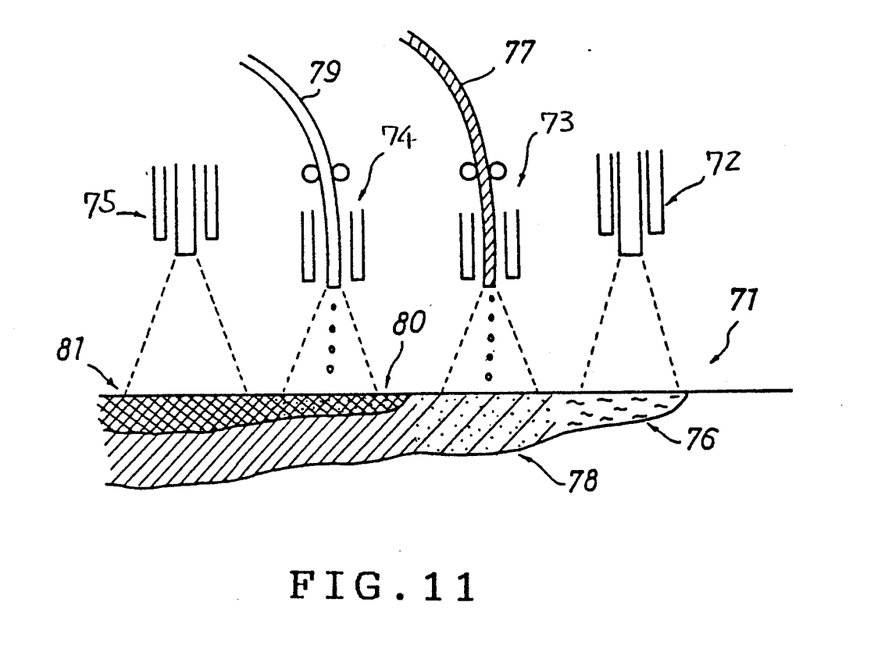
FIG. 11 illustrates a schematic section of a sixth embodiment of the present invention.

Finally, in the sixth embodiment of the present invention, which is illustrated in FIG. 11, not only is the object part 71 subjected to the melting-then-overlaying twice-treatment as in the foregoing fifth embodiment method, but the resultant overlay is remelted for the second time for further homogenization. Namely, the object part 71 is first melted by a first welding device which is a TIG torch 72, thereby forming the molten metal layer 64, then is overlaid twice over with heat resisting alloy layers 78 and 80 by a second welding device (first by the first MIG 73 with a Co-containing first heat resisting alloy layer 78 using a composite wire 77, then by the second MIG welder 74 with a second heat resisting alloy layer 80 using a heat resisting steel wire 79); then, subsequently and serially, the second heat resisting alloy layer 80 is subjected to the remelting treatment by a third welding device which is a TIG torch 75 thereby forming a remelted heat resisting alloy layer 81. The remelted heat resisting alloy layer 81 thus formed is of a greatly improved heat resistivity and a markedly homogenized structure.

It is to be noted moreover that there can be many ways of using high density energy sources for the first, second and third welding devices other than the specific combinations cited in the foregoing six embodiments. Namely, TIG torch for the first and third welding device primarily to perform the melting or remelting, and plasma welder or MIG welder for the second welding device primarily to perform the weld overlaying. The feasible, recommendable and preferable high energy sources are as presented in Table I.

TABLE 1

| High Density Energy Source | Melting or Remelting | Alloying | |
|---|---|---|---|
| | | Powder | Wire |
| TIG | ⊕ | ⊕ | ⊕ |
| Plasma | ⊕ | ⊕ | ⊕ |
| Electron Beam | ⊕ | Δ | Δ |
| Laser | ⊕ | Δ | Δ |
| MIG | x | x | ⊕ |

⊕: well suited;
Δ: usable, but the productivity is low; and
x: not to be used.

Here, the major featurs of these high density energy sources are as follows:
TIG: inexpensive and deep penetration obtainable;
Plasma: easy powder feeding;
Electron beam: alloyed layers thickly obtainable;
Laser: ditto; and
MIG: high welding speed.

We claim:

1. A method of modifying qualities of a metallic article at its surface, comprising the steps of:
    (A) melting the surface with high density energy to form a molten metal layer; and
    (B) adding to the molten metal layer a heat resisting element by performing overlay welding at least twice thereon.

2. A method as recited in claim 1, wherein the overlay welding is performed using powders.

3. A method of claim 2, wherein each power includes heat resisting metal selected from the group consisting of Ni, Co, Mo and Cr.

4. A method as recited in claim 2, wherein the powder includes capsule particles made up of a heat resisting element as a core and metallic particles as an envelope of the core.

5. A method of claim 4, wherein the core particle of the capsule is a heat resisting selected from the group consisting of Ni, Co, Mo and Cr, or a ceramic particle selected from the group consisting of $Al_2O_3$, SiC, $Si_3N_4$ and CuO.

6. A method as recited in claim 4, wherein the surface of the article has a matrix and the enveloping metallic particles of the capsule is of a metal of good miscibility with the matrix of the surface, 7. A method as recited in claim 4, wherein the surface of the article has a matrix and the sheath of the composite wire is of a metal of good miscibility with the matrix of the surface.

8. A method as recited in claim 2, wherein the overlay welding using the powder is performed by a TIG welder or a plasma welder.

9. A method as recited in claim 1, wherein the overlay welding is performed using a welding wire containing a heat resisting element.

10. A method as recited in claim 9, wherein the welding electrode is a wire made of heat resisting steel.

11. A method as recited in claim 9, wherein the welding electrode is a composite wire made by filling a sheath with capsule particles.

12. A method as recited in claim 9, wherein the overlay welding using the welding wire is performed by any one of a TIG welder, a plasma welder or a MIG welder.

13. A method as recited in claim 1, wherein the high density energy used perform the melting or the remelting is created by any one of a of TIG, plasma, electron beam or laser beam welder.

14. A method as recited in claim 1, wherein at least one of the repetitious overlay weldings is performed by a MIG welder.

15. A method of modifying qualities of a metallic article at is surface, comprising the steps of:
    (A) melting the surface with high density energy thereby forming a molten metal layer;
    (B) adding to the molten metal layer a heat resisting element by performing overlay welding at least twice thereon, thereby forming an alloy layer; and
    (C) remelting the alloy layer with high density energy.

16. A method of modifying qualities of a specified part of an article using high density energy, comprising the steps of:
    (A) manufacturing a composite wire by filling up a sheath with capsule particles, each capsule particle being made by enveloping a core particle with metallic particles, the core particle being made from heat resisting element;
    (B) performing overlay welding to the article with the high density energy, thereby forming a molten metal layer;
    (C) performing overlay welding to the molten metal layer by a MIG welder using the composite wire made in step (A), thereby forming an alloy layer; and
    (D) performing overlay welding to the alloy layer by a second MIG welder using a welding wire made of a heat resisting steel.

17. An apparatus for modifying qualities of a specified surface part of a metallic article using high density energy, comprising:
    a first welding device for imparting the high density energy to the specified part to melt the specified part, while translating itself in a given direction; and
    a second welding device disposed behind the first welding device in the given direction with a predetermined distance for performing overlay welding at least twice over the melted specified part using a heat resisting element, the second welding device including at least two welding elements arranged in series.

18. An apparatus as recited in claim 17, wherein the first welding device is any one of a TIG, plasma, electron beam or laser welder.

19. An apparatus as recited in claim 17, wherein the second welding device is any one of a TIG, plasma or MIG welder.

20. An apparatus for modifying qualities of a specified surface part of a metallic article using high density energy, comprising:

a first welding device for imparting the high density energy high density energy to the specified part so as to melt the specified part, while translating itself in a given direction;

a second welding device disposed behind the first welding device in the given direction with a predetermined distance for performing overlay welding at least twice using a heat resisting element so as to form an alloy layer, the second welding device including at least two welding elements arranged in series; and a third welding device disposed behind the second welding device in the given direction at a predetermined distance for imparting the high density energy to the alloy layer so as to melt the alloy layer.

* * * * *